May 23, 1933. G. W. BURK 1,910,748
MACHINE FOR AND METHOD OF PROCESSING LAMINATED GLASS
Filed July 27, 1928
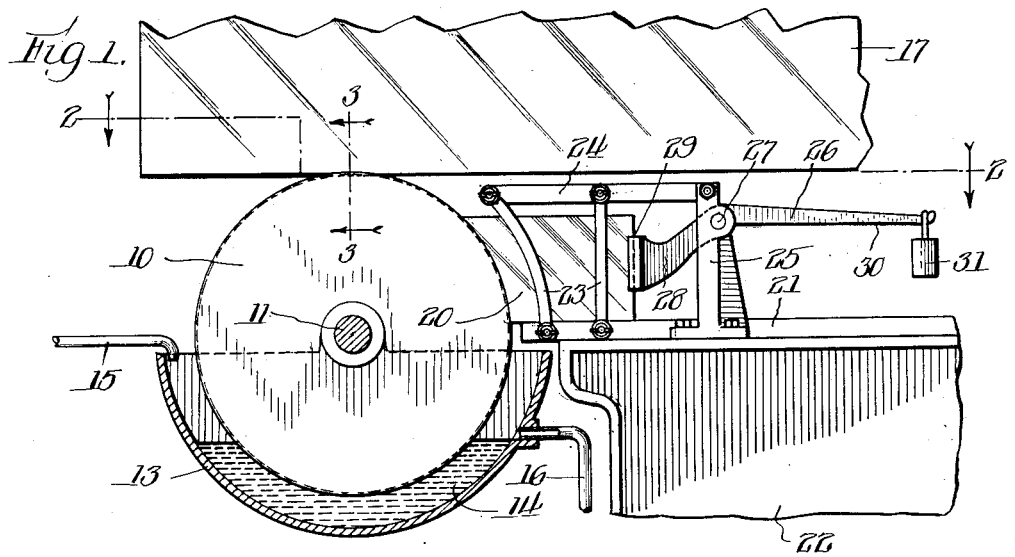
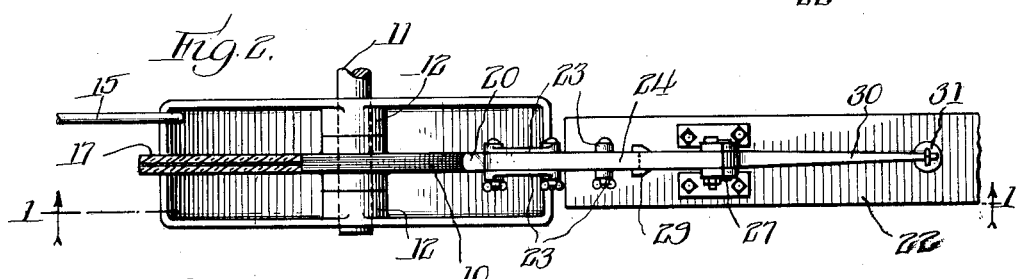
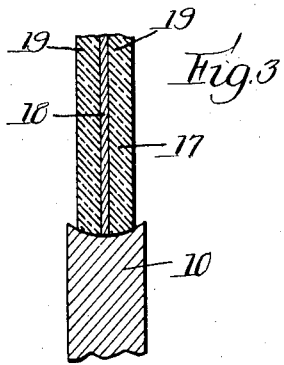
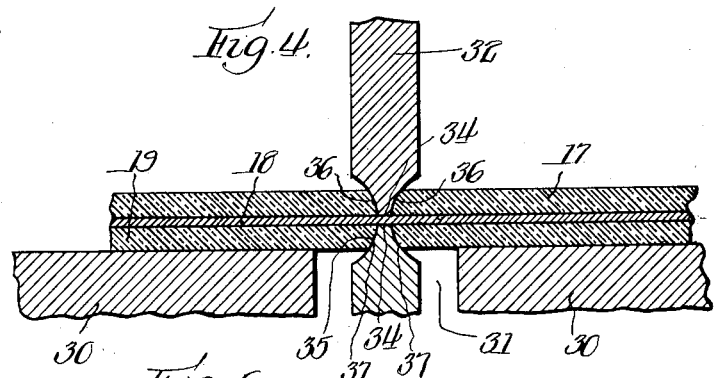
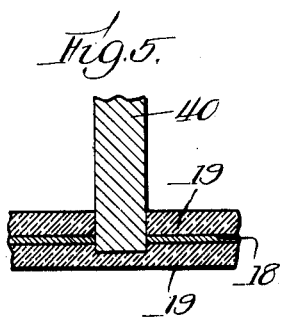
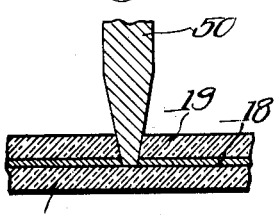
Inventor:-
George W. Burk,
By Wilkinson, Huxley, Byron & Knight attys.

Patented May 23, 1933

1,910,748

UNITED STATES PATENT OFFICE

GEORGE W. BURK, OF CHICAGO, ILLINOIS

MACHINE FOR AND METHOD OF PROCESSING LAMINATED GLASS

Application filed July 27, 1928. Serial No. 295,699.

This invention relates to a method and apparatus for processing glass and particularly for cutting and edging or beveling laminated glass of the type known as safety or non-shatterable glass which is composed of superimposed sheets of glass and celluloid or other similar transparent material.

This invention employs a grinding means for processing the glass as above described and relates particularly to a means and method for maintaining the surface of the grinding wheel free from accumulations of celluloid or similar material incorporated with the glass layers.

This type of glass is well-known in the art and it is understood that it may be made up, and is usually formed, by providing an intermediate sheet of celluloid between the outside sheets of glass.

It is to be understood that the present invention is applicable for use with any type of glass of this general character and relates to glass composed of either plate or drawn window glass and celluloid or any other similar material which would serve in this use.

It is also conceivable that various arrangements of layers of glass and celluloid may be employed in the formation of sheets of laminated glass which are subject to being processed in accordance with the present invention with the same degree of success as the conventional type of glass now made.

The present invention enables laminated glass to be cut, edged, beveled, or otherwise processed, which glass is composed of a combination of sheets of glass and celluloid, or like material without reference to how they are arranged relative to each other.

Prior to the present invention, as far as the applicant is aware, considerable difficulty has been encountered in all attempts to cut or process laminated glass of the above described type. Consequently, it has been the practice, in the manufacture of laminated glass, to make each piece approximately the finished size and shape prior to uniting the various laminations one to the other incorporating the celluloid material.

Further, in finishing the glass pieces so made, it has been the practice to finish the edges by manual application to wheels requiring careful manipulation for removing the rough edges of the outside glass layers and leaving the celluloid layer substantially intact which layer has been subsequently removed and finished by a knife or other suitable means.

The present invention accordingly aims to overcome these objections and provide for the first time an efficient and simple means by which laminated glass, of the above described type, may be cut and processed with the same ease and success as that of ordinary glass.

The present invention proceeds upon the principle of grinding or abrading by such means and method that the glass is successfully processed as desired without interference due to the presence of the layer or layers of celluloid or corresponding similar material.

The merits of the present invention will appear from the disclosure of one embodiment thereof which is given merely by way of example, and the utility of the invention will be obvious from the advantages which are realized in the particular embodiment illustrated.

The following description will be more readily understood by referring to the accompanying drawing, in which—

Figure 1 is a side elevation of a means by which the present invention may be practiced.

Figure 2 is a plane view partially in cross section taken on the line 2—2 of Figure 1 and looking in the direction of the arrows.

Figure 3 is an enlarged cross sectional view taken on the line 3—3 of Figure 1 and looking in the direction of the arrows.

Figure 4 illustrates a modified form of means for practicing the present invention.

Figure 5 represents another modified form of practicing the present invention.

Figure 6 represents a third modified form of practicing the present invention.

It is to be understood, in connection with this invention, that the real value thereof resides in the principle and that the principle may be practiced by any suitable means without limitation as to arrangement and structure, and accordingly the device disclosed in the drawing will not be considered as limiting in any respect but merely a device illustrative in character by which the invention may be practiced.

By referring to the drawing, it will be noted that Figure 1 of the present disclosure relates to an edging or glass beveling wheel 10 mounted on a suitable shaft 11 carried in bearing 12 adapted to be rotated by any suitable source of power, not shown, connected as for instance to shaft 11. Surrounding the lower half of the wheel is a trough 13 adapted to contain water or other cooling liquid or media 14 which may be by way of example introduced through by pipe 15 and discharged at the desired level through a pipe 16.

It is to be understood that this wheel may be of any suitable type, but is preferably a relatively hard and smooth wheel similar to the artificial (manufactured) or natural stone smoothing wheels now supplied to the glass trade for performing the smoothing operation in edging or beveling glass.

In Figure 1 is illustrated a sheet of laminated glass 17 which is carried substantially in the position shown, either manually or by any suitable machinery, so that it is slowly advanced in the direction opposed to the rotary movement of the wheel at the point of contact, whereby it is passed over the wheel throughout the entire length of the edge or area to be processed.

Although the showing in Figure 1 illustrates a device in which the glass is advanced in the direction opposed to the rotary movement of the grinding wheel, it is obvious that the essential feature is to provide relative movement therebetween such as will accomplish the grinding action, and accordingly, the invention may be practiced if desired by reversing the direction of glass travel relative to the wheel rotation. It is, however, the usual practice and more desirable to advance the glass in a direction opposed to the wheel rotation in the manner shown.

As shown in Figure 3, the glass 17 comprises an intermediate layer 18 of celluloid or other corresponding material located between the outside glass layers 19.

It has been found in practice that when grinding, wheels of the above described type are used for beveling or otherwise finishing laminated glass that the material constituting the intermediate layer 18 is caused, during the abrading action, to be deposited on and adhered to the surface of the wheel in irregular patches or streaks such that the grinding character of the surface of the wheel is seriously impaired or destroyed and that the glass is caused to bump up and down resulting in damage to the glass and a failure in the operation of the process.

The present invention, however, embodies means whereby any deposit of celluloid or corresponding material on the surface of the wheel is removed as rapidly as it is deposited whereby the wheel surface remains unimpaired to carry on its normal grinding action.

The invention contemplates any means whereby this action is accomplished, and it is found in practice that by placing an element in contact with the wheel during the grinding operation which will by frictional contact therewith produce any one of or the combination of scraping, burning or frictionally removing the deposited celluloid or similar material, that the wheel surface is maintained free from the deposited material and at all times presents a good grinding face which will produce clean and smooth cuts in or edges on laminated glass.

Accordingly, by referring to the drawing, the disclosure embodies a scraping piece 20 which may be of ordinary plate glass, vitrolite or any similarly acting substance contacting the wheel through a substantial arc and provided with a corresponding shaped face cooperating with the face of the periphery of the grinding wheel 10.

It is to be understood that various materials may be used in this capacity and that the invention covers any and all materials which will serve well. Any form of means may be provided for maintaining the element 20 in contact with the wheel either by a fixed pressure or by means such as a weight or spring which will cause the element to follow up and remain in constant contact after a certain amount of wear takes place.

By way of illustration, I have shown a mounting for the element 20 which comprises a base 21 mounted on any suitable frame 22 which base supports the side brackets 23 and cross bracket 24, all of which serve to maintain the element 20 against displacement.

I have further provided, by means of the upstanding bracket 25 and the lever 26 which is pivoted at 27 to the bracket and having one arm 28 contacting the element 20 as at 29 and the other arm 30 provided with a suitable weight 31, a means by which the element 20 may be kept in constant contact with the periphery of the wheel.

It is to be understood that the present invention relates to the principle herein taught and it is not to be limited in any way by the present disclosure, and accordingly, the invention is applicable to horizontally disposed wheels mounted on vertical pivots or wheels mounted in any other manner, and that the invention contemplates the processing of laminated glass by means of a grinding wheel in combination with a means for removing the accumulated deposits thereon such as a suitable frictional contacting element cooperating therewith acting to remove by scraping, burning or otherwise frictionally removing the deposited celluloid or similar material.

As regards the removal of the deposited celluloid or other material from the surface of the grinding wheel, the invention contemplates any and all methods for accomplishing this result. In other words, the invention includes means such as a torch, for instance, which is positioned to direct its flame against the periphery of the wheel in a manner to remove the deposited matter thereon.

This invention also contemplates the use of wheels which require water or other cooling medium, and as well, wheels of such character that no water or cooling medium is required.

Referring now particularly to Figure 4, an embodiment of this invention is illustrated as applied to cutting of laminated glass of the above described type in which the glass 17 is placed on a suitable supporting surface 30 provided with an opening 31 for accommodating the abrasive wheels.

In this illustration, two wheels are provided, one 32 operating from above and the other 33 operating from below. These wheels may have any desired form of cutting edges, but as illustrated are provided with the central flanges 34 and 35, respectively, having the curved surfaces 36 and 37 substantially as shown in the drawing. The wheels are initially spaced in such a manner that they cut through the outside layers 19 of glass but will leave uncut the intermediate layer 18 of celluloid or similar material. It is, of course, understood that the glass is advanced relative to the wheel at the proper rate to effect the cutting at a maximum practical speed without damage to the glass.

Although the invention may be practiced by having wheels cutting from above and below, which have any form of cutting edges, the form of wheels shown in Figure 4 is designed to finish by rounding the edges of each piece of glass during the cutting operation so that upon completion of the cutting operation it is only necessary to sever the celluloid strip by any suitable means and to finish its edge flush with the edge of the glass layers.

The invention further contemplates providing a wheel similar to the wheels shown in Figure 4 which will cut partially through the glass, such as for instance, through the top glass layer 19, after which the glass is then turned on its opposite side and cut through the other glass layer 19. This accomplishes the two operations with the same result as is accomplished by the two wheels in a single operation.

The wheels 32 and 33 may be provided with suitably formed scrapers of proper material applied in a manner similar to that taught in connection with the form of the invention shown in Figure 1, or applied in any other manner which will accomplish the same result, or the wheels may be provided with a torch or any other suitable means for removing the deposited material from the surface thereof. This invention as applied for cutting in the manner illustrated in Figure 4 is found to serve well because in practice it is difficult to prevent some of the celluloid material from contacting the edge of the flanges 34 and 35 and consequently a removal of such material is necessary to successfully perform the cutting operation.

Referring now to Figures 5 and 6, I have illustrated two forms of wheels employed for cutting laminated glass, the wheel 40 being of equal thickness throughout and having a squared edge, whereas the wheel 50 is provided with tapered sides, producing a relatively narrow outside edge.

In either of these cases a successful cutting operation may be practiced by causing the wheel to completely penetrate the entire thickness of the glass, as indicated in Figure 5, where the wheel 40 has penetrated the upper and intermediate layers and is partially through the last layer, or the wheel may be caused to penetrate only the upper glass layer and the intermediate celluloid layer, after which the cutting operation is stopped and the final separation of the parts of the remaining glass layer may be accomplished by means of an ordinary glass cutter. Here again the wheels are provided with some means for removing the deposited celluloid material such as a scraper of suitable character or a torch or other means for accomplishing the same result.

From the above, it can be readily appreciated that the applicant has devised a method for cutting and processing laminated glass and that his invention is based upon a grinding or abrading principle, with provisions for removing the accumulated celluloid as it is deposited from the surface of the wheel whereby the grinding surface is maintained unimpaired.

This invention makes it possible to grind, cut and finish laminated glass by eliminating the detrimental coating of celluloid as fast as it appears. The removal is accomplished by any suitable means, such as for instance, a friction scraper which scrapes, burns and otherwise frictionally removes the material.

It is to be understood that wherever scrapers are employed with the grinding wheel that it is contemplated that they be of proper shape to cooperate with the wheel and contact all of the surface thereof that may become exposed to or coated with the celluloid layer.

The above disclosure is given merely as one embodiment of the present invention, and is not to be considered as limiting the invention in any way. The scope of the invention will be determined by an understanding of the present disclosure as one embodiment thereof and will be particularly pointed out in the appended claims.

I claim:

1. The method of processing laminated glass having a layer of tough transparent material, which comprises subjecting the laminated glass to the abrading action of a smooth, rotating wheel and simultaneously subjecting said wheel to the action of a glass shoe in frictional contact therewith.

2. The method of processing laminated glass having a layer of tough transparent material, which comprises subjecting the laminated glass to the abrading action of a smooth, rotating wheel and simultaneously removing from the surface of said wheel, by a combined frictional scraping and burning action, accumulations of said tough, transparent material, and also recharging the pores of the abrading surface of said wheel with particles of glass derived from a source other than from the glass being processed.

3. The method of processing laminated glass having a layer of tough transparent material which comprises subjecting the laminated glass to the abrading action of a smooth rotating wheel and simultaneously removing, by frictional scraping and burning, accumulations of said tough transparent material from the abrading surface of said wheel and re-charging the pores thereof with particles of glass, by the action of a glass shoe in frictional engagement with said wheel.

4. A device for processing laminated glass having a layer of tough transparent material which comprises a smooth abrading wheel and a glass shoe mounted in frictional contact with the abrading surface thereof.

5. A device for processing laminated glass having a layer of tough transparent material which comprises a smooth abrading wheel having concaved side faces and a glass shoe mounted in frictional contact with the abrading surface thereof.

6. A device for processing laminated glass having a layer of tough transparent material which comprises a smooth abrading wheel, having an abrading portion of diminishing thickness towards the outer edge, and a glass shoe mounted in frictional contact with the abrading surface thereof.

7. A device for processing laminated glass having a layer of tough transparent material which comprises a smooth abrading wheel and a glass shoe mounted in frictional contact with the abrading surface thereof and means for continuously urging said glass shoe in contact with said surface at a predetermined pressure.

Signed at Chicago, Illinois, this 25th day of July, 1928.

GEORGE W. BURK.